United States Patent [19]

Mori et al.

[11] 3,797,725

[45] Mar. 19, 1974

[54] AUTOMATIC SOLDERING MACHINE

[75] Inventors: Yubi Mori, Osaka; Morihiro Hanakura, Nara, both of Japan

[73] Assignee: Matsushita Electric Industrial Co., Ltd., Osaku-fu, Japan

[22] Filed: Apr. 11, 1972

[21] Appl. No.: 242,921

[30] Foreign Application Priority Data
Apr. 14, 1971 Japan.............................. 46-24149
Apr. 14, 1971 Japan.............................. 46-24150
Apr. 14, 1971 Japan.............................. 46-24151

[52] U.S. Cl.................... 228/41, 219/85, 226/158, 228/51, 228/52
[51] Int. Cl............................................ B23k 1/00
[58] Field of Search.................. 228/41, 51, 52, 53; 219/85; 226/151, 158, 160, 165, 166

[56] References Cited
UNITED STATES PATENTS

| | | | |
|---|---|---|---|
| 2,891,308 | 6/1959 | Lyons | 228/41 X |
| 2,953,290 | 9/1960 | Kostenko et al. | 226/151 |
| 3,298,666 | 1/1967 | Prange | 226/158 X |
| 3,437,252 | 4/1969 | Beaver et al. | 228/53 |
| 3,652,819 | 3/1972 | Kerr et al. | 228/41 X |

FOREIGN PATENTS OR APPLICATIONS
206,332   5/1955   Australia.............................. 226/166

*Primary Examiner*—J. Spencer Overholser
*Assistant Examiner*—Robert J. Craig

[57] ABSTRACT

An automatic soldering machine is provided in which a solder wire feeding device comprises an outer cylinder and an inner cylinder coaxially slidably fitted therein for reciprocal motion, and a solder wire passes along the axes of the outer and inner cylinders. In the upper portion of the inner cylinder and in the lower portion of the outer cylinder are disposed solder wire clamping mechanisms in each of which a plurality of balls are so arranged as to be forced to move toward the solder wire surrounded by the balls thereby clamping the solder wire when the latter is moved in the direction opposite to the solder wire feed direction and to move away from the solder wire to release it when it is moved in the feed direction. When the inner cylinder is vertically reciprocated in unison with a solder wire supply reel, the solder wire is automatically and intermittently fed by a predetermined length under the cooperation of said two clamping mechanisms.

11 Claims, 8 Drawing Figures

3,797,725

PATENTED MAR 19 1974 3,797,725
SHEET 2 OF 2
FIG. 3
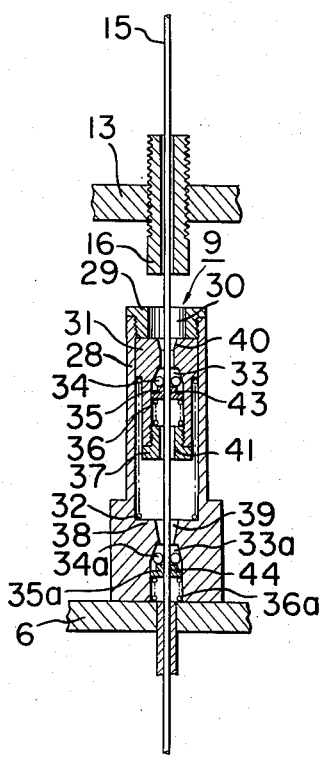
FIG. 7
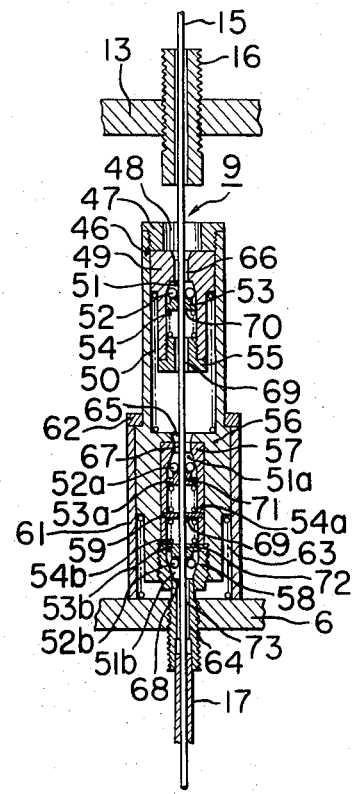
FIG. 4A
FIG. 4B
FIG. 5
FIG. 6

AUTOMATIC SOLDERING MACHINE

BACKGROUND OF THE INVENTION

The present invention relates to generally an automatic soldering machine and more particularly an improvement of a solder wire feeding device thereof.

In the prior art solder wire feeding devices incorporated in the automatic soldering machines, the solder wire is generally fed by a pair of feed rollers which are rotated step by step through a predetermined angle of rotation by, for example, a chain drive mechanism through an one-directional clutch. These solder wire feeding devices have the common inherent defects that the solder wire cannot be fed correctly by a predetermined length because of the slippage thereof on the feed rollers and the fabrication cost is very expensive. In some prior art solder wire feeding devices, the driving mechanism for feeding the solder wire is provided independently of the driving mechanism for reciprocating the soldering iron to and away from the joints to be soldered. However, they have also the disadvantages that they are large in size, complicated in mechanisms including control mechanism and expensive to manufacture.

SUMMARY OF THE INVENTION

Briefly stated, according to the present invention, a solder wire feeding device is mounted upon a supporting member which supports and reciprocates a soldering iron, and after the soldering bit has been pressed against the joints to be soldered, the solder wire feeding device is actuated by a driving mechanism which causes the reciprocal motion of the supporting member. The solder wire feeding device comprises an outer cylinder, an inner cylinder coaxially and slidably fitted into the outer cylinder for reciprocal motion therein, and a compression spring loaded between them. The solder wire passes axially of the solder wire feed device. In the base portion of the outer cylinder and in the inner cylinder are formed hollow portions whose upper portions terminate into conical surfaces and in which are disposed solder wire clamping mechanisms. Each of the clamping mechanisms comprises a plurality of balls, a retainer having radial grooves for retaining the balls in position in such a manner that the solder wire may be surrounded by the equiangularly spaced apart balls, and a spring which causes the balls to press against the conical surface. Therefore the clamping mechanism can clamp the solder wire when the latter is moved in the direction opposite to the feed direction, but can release the solder wire when the latter is moved in the feed direction. The solder wire feeding device of the present invention is very simple in construction, and yet is capable of correctly feeding the solder wire by a predetermined length.

According to one embodiment of the present invention, an additional clamping mechanism similar in construction and function to those described above is located in the base portion of the outer cylinder and below said clamping mechanism in a back-to-back or opposite direction so that said additional clamping mechanism may clamp the solder wire when the outer cylinder is moved in the direction opposite to the feed direction. Therefore the free or feed end of the solder wire may be moved away from the feeding end of a feed nozzle and hence the soldering bit after the application of solder to the joints so that the undesirable melting of the free or feed end portion of the solder wire in an inoperative position due to the heat from the soldering bit may be prevented.

According to another embodiment of the present invention, the soldering iron is supported through cushioning means so that the soldering bit may be pressed against the joints to be soldered with an optimum pressure and the uniform soldering may be ensured even when the joints are varied in position and in height.

According to another embodiment of the present invention, the automatic soldering machine may be forwardly or backwardly inclined so that the angular positions of the soldering iron relative to the joints may be arbitrarily in order to attain the best soldering effects and to facilitate the soldering operations.

The above and other features and advantages of the present invention will become more apparent from the following description of the preferred embodiments thereof taken in conjunction with the accompanying drawings.

BRIEF DESCRIPTION OF THE DRAWINGS

FIG. 3 is a fragmentary sectional view thereof on a somewhat enlarged scale illustrating a solder wire feeding device thereof;

FIG. 4A is a top view of a steel ball retainer used in clamping mechanism incorporated in the solder wire feeding device shown in FIG. 3;

FIG. 4B is a sectional view thereof taken along the line A—A of FIG. 4A;

FIG. 5 is a view illustrating a solder wire securely and correctly clamped in position by a plurality of steel balls in the clamping mechanism;

FIG. 6 is a view illustrating the locally clustered steel balls so that the solder wire is not correctly clamped; and FIG. 7 is a view similar to FIG. 3 illustrating a second embodiment of a solder wire feeding device in accordance with the present invention incorporating a mechanism for retracting a solder wire by a predetermined length away from a soldering bit after application of solder to the joints in order to prevent the undesirable melting of the solder wire end in an inoperative position.

Figure 1:
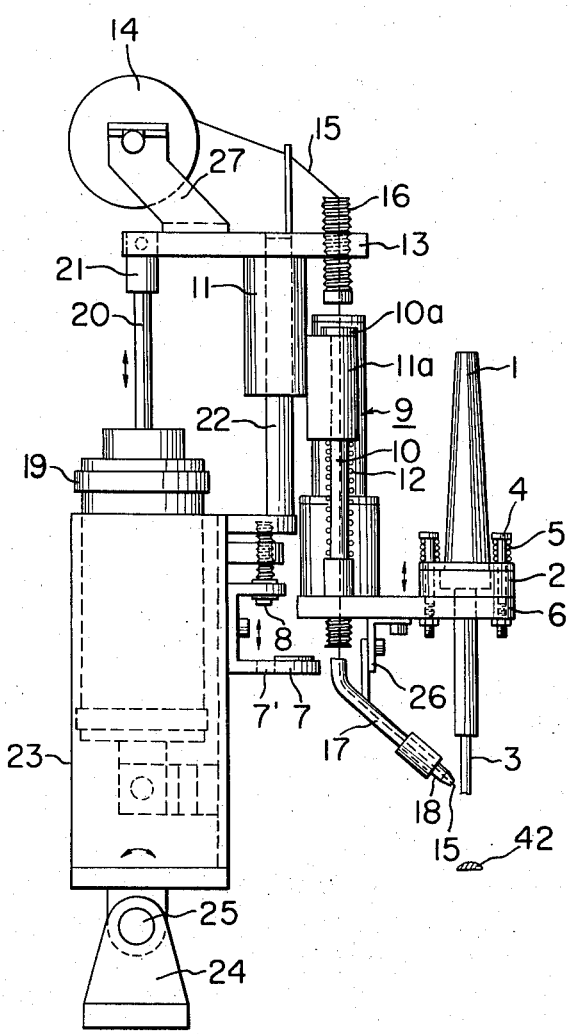
FIG. 1 is a side view of a first embodiment of the automatic soldering machine in accordance with the present invention.
Figure 2:
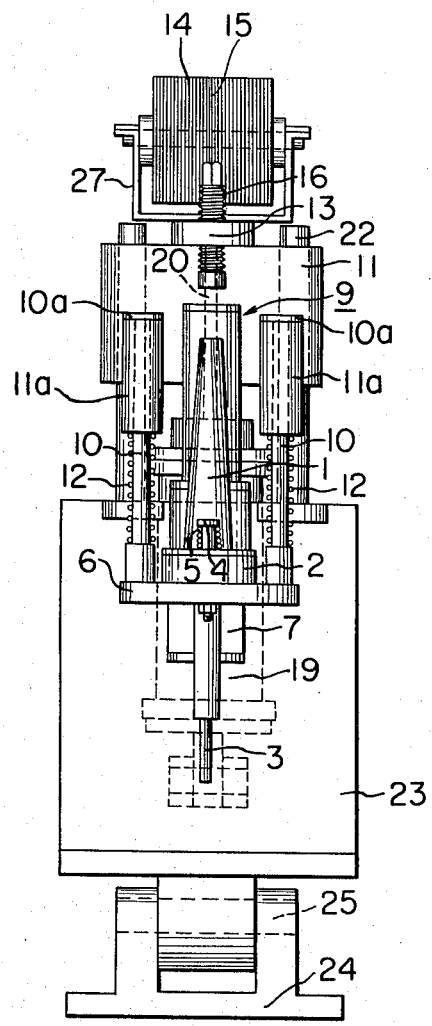
FIG. 2 is a front view thereof.

DESCRIPTION OF THE PREFERRED EMBODIMENT:

Referring to the accompanying drawings, and particularly FIGS. 1, 2 and 3, a soldering iron 1 is vertically supported by a soldering iron support 2, and springs are fitted over adjusting pins 4 extending from a bracket 6 between the support 2 and the heads of the adjusting pins 4 so that the pressure exerted to the joints 42 from a soldering bit 3 may be appropriately adjusted and the variation in height of the joints 42 may be properly compensated. That is, in order to adjust the height of the soldering bit 3 relative to the joints 42, a stopper 7 is located to abut against the undersurface of the bracket 6, and the position of the stopper 7 in turn may be adjusted by loosening and tightening an adjusting bolt 8 by an appropriate tool (not shown) which may be inserted through an opening 7' of the stopper 7. The bracket 6 is fixed to the lower ends of slide shafts 10 slidably fitted into cylinder bores 11a in a head structure 11 which in turn is securely fixed to a bridge or support member 13, and to the bracket 6 is attached a solder wire feed device 9, the most important component of the present invention. Thus the bracket 6 is vertically movable and is biased to normally move downwardly under the forces of springs 12 which are fitted over the slide shafts 10 between the undersurface of the head structure 11 and the upper surfaces of the lower enlarged diameter portions of the slide shafts 10 as best shown in FIG. 2. The slide shafts 10 are prevented from coming off by flanges 10a formed at the upper ends thereof.

A solder wire supply reel 14 is rotatably supported by a bracket 27 which in turn is fixed to the upper surface of the bridge member 13, and a device 16 for adjusting the feed of solder wire 15 is extended through the bridge member 13 at one end thereof remote from the solder wire reel 14. The solder wire 15 is so arranged as to be fed to the soldering tip 3 from the solder wire supply reel 14 through the wire feed adjusting device 16, the solder wire feed device 9, a curved solder wire guide 17 located below the bracket 6 and supported thereby through a bracket 26, and a solder wire feed nozzle 18 at the lower end of the curved guide 17. The curved guide 17 and the nozzle 18 may be so designed as to be varied in position relative to the soldering bit 3.

The other end of the connecting member 13 is securely fixed through a coupling member 21 to the upper end of a rod 20 of a power cylinder 19 so that the connecting or bridge member 13 as well as the head structure 11 attached thereto may move vertically along rods 22.

Frame 23 is pivotably fixed with a pivot 25 to a bracket 24 so that it may be inclined forwardly or backwardly when required.

Next referring particularly to FIG. 3, the solder wire feed device 9 will be described in more detail hereinafter. The device 9 comprises generally an outer cylinder 28 whose upper end is closed with a cover 29 having a cylinderical hole 30 for passing therethrough the lower portion of the feed adjusting device 16 when the latter is lowered. An inner cylinder 31 is slidably fitted into the outer cylinder 28, and is biased to normally move upwardly under the force of a spring loaded between the annular shoulder portion of the inner cylinder 31 and the bottom of the hollow portion of the outer cylinder 29. The inner cylinder 31 comprises a hollow portion 33 conical in cross section whose lower end is closed with a cap 37. In the hollow portion 33 are received a plurality of steel balls 34 (four balls being shown) which are retained in position by a retainer 35 so as to surround the solder wire 15 as best shown in FIG. 5 and are biased to normally move upwardly in unison under the force of a spring 36 loaded between the retainer 35 and the cap 37. In the large diameter base portion of the outer cylinder 28 is also formed a hollow portion 33a which is substantially similar to the conical hollow portion 33 of the inner cylinder 31 and which receives therein a plurality of steel balls 34a which are retained in position by a retainer 35a and are so biased as to be normally pressed against the conical surface of the hollow portion 33a under the force of a spring 36a loaded between the retainer 35a and the bracket 6.

Since the steel balls 34 in the inner cylinder 31 are pressed against the conical surface of the hollow portion 33 under the force of the spring 36, the pressure is exerted to the solder wire 15 from the steel balls 34 surrounding the wire. Therefore, when the inner cylinder 31 is moved downwardly by the feed adjusting device 16, the steel balls 34 serve to clamp the solder wire 15, so that the solder wire 15 may be fed downwardly by a length equal to the down stroke of the inner cylinder 31. However, the steel balls 34a in the hollow portion 33a are caused to move downwardly so that the solder wire 15 may be fed downwardly without being clamped by the lower steel balls 34a.

In the upward stroke of the feed adjusting device 16, the inner cylinder 31 is returned to its initial position under the force of the spring 32 so that the steel balls 34 release the solder wire 15. However, the lower steel balls 34a are pressed against the conical surface of he hollow portion 33a so that the solder wire 15 is clamped and is prevented from rising together with the inner cylinder 31.

A solder wire guide hole 39 of inverted frusto-conical cross section is formed at the center of the bottom 38 of the hollow portion of the outer cylinder 28, and holes 40, 41, 43 and 44 for passing the solder wire 15 are formed in the inner cylinder 31, the cap 37 and the steel ball retainers 35 and 35a, respectively.

Next referring to FIGS. 4a and 5, the construction of the steel ball retainers 35 and 35a which are similar in construction will be described. As shown in FIGS. 4a and 4b, grooves 45 (45a) are formed on the upper surface of the retainer 35 (35a) for receiving therein the steel balls 34 (34a), the grooves 45 (45a) being radially extending from the center of the hole 43 (44) through which the solder wire 15 passes. These grooves 45 (45a) serve to prevent the steel balls 34 (34a) from being locally concentrated as shown in FIG. 6 when they are pressed against the conical surface of the hollow portion 33(33a), so that the solder wire 15 may be prevented from escaping from the steel balls 34 (34a) from a gap therebetween or from being exerted with the weak clamping force since the solder wire 15 is retained only between the two adjacent steel balls. Thus the solder wire feed operation may be stabilized even for small-diameter solder wires as they are firmly clamped by the forces exerting from all steel balls surrounding the wire. Although only four steel balls are shown in the instant embodiment, it is clear to those skilled in the art that the number of steel balls may be increased or decreased depending upon the diameter of a solder wire.

Next the mode of operation of the automatic soldering machine of the present invention will be described. First the joints 42 are set in a soldering position and the power cylinder 19 is actuated to retract the rod 20. Then the head assembly 11 is lowered along the guide rods 22 so that the bracket 6 is also lowered until it engages with the stopper 7. At this moment, the leading end of the bit 3 engages with the joints 42. When the rod 20 is further retracted, the solder wire feed adjusting device 16 engages with the inner cylinder 31 and causes it to move downwardly against the spring 36 so that the solder wire feed operation described hereinbefore is started in order to feed a predetermined length of the solder wire 15 to the soldering bit 3 through the nozzle 18. The solder wire thus fed is melted by the soldering bit 3 to solder the joints 42.

Next the rod 21 is advanced to that the head structure 11 and the feed adjusting device 16 are moved upwardly. The inner cylinder 31 is also moved upwardly until it is stopped by the cap 29, and thereafter the feed adjusting device 16 is moved away from the inner cylinder 31 and is further moved upwardly. As the head structure 11 is moved upwardly, it engages with the flanges 10a of the slide shafts 10 fitted into the cylinder blocks 11a so that the bracket 6, the solder wire feed device 9 and the soldering iron 1 are moved upward to their initial positions. The above operation is automatically repeated to continuously solder the joints.

In FIG. 7 is shown the second embodiment of the solder wire feeding device in accordance with the present invention which is substantially similar in construction to the first embodiment described with reference to FIGS. 1–6 except that it further comprises an additional clamping mechanism and the outer cylinder is so designed as to move toward and away from the bracket 6 by a predetermined distance, so that the same parts common in the first and second embodiments are designated by same reference numerals and only those different from the first embodiment will be described hereinafter.

The second embodiment of the feeding device generally designated by 9 in FIG. 7 is substantially similar in construction to the first embodiment described hereinbefore except the parts to be described hereinafter. The upper end of a hollow cylinder 46 is closed with a cover 47 having a hole 48 through which passes the lower portion of the solder wire feed adjusting device 16 when the latter is lowered. An inner cylinder 49 is slidably fitted into the outer cylinder 46 and is biased so as to normally move upwardly under the force of a spring 50 loaded between the annular shoulder of the inner cylinder and the bottom of a hollow portion of the outer cylinder 46. In a frustoconical hollow portion 51 formed in the inner cylinder 49 are received a plurality of steel balls 52 which are retained in position by a steel ball retainer 53 so as to surround the solder wire 15 extending through the solder wire feeding device 9. The steel balls 52 are biased so as to normally move upwardly under the force of a spring 54 loaded between the steel ball retainer 53 and a cap 55 which closes the lower end of the inner cylinder 49. As is the case of the first embodiment, when the steel balls 52 are pressed against the conical surface of the hollow portion 51, they are moved toward each other so that the solder wire 15 surrounded by the steel balls 52 is exerted with the clamping forces therefrom. In the large-diameter base portion of the outer cylinder 46 and below the bottom 56 of the hollow portion or hole thereof is formed a hole into which is fitted an upper inner cylinder 57 which is similar in construction to the upper inner cylinder 49, and a lower inner cylinder which is also similar in construction to the inner cylinder 58 but is located in the reversed direction. In a frustoconical hollow portion 51a formed in the upper inner cylinder 57 are received a plurality of steel balls 52a which are retained in position by a steel ball retainer 53a and are biased so as to normally move upwardly under the force of a spring 54a loaded between the steel ball retainer 53a and a collar 59 interposed between the upper and lower inner cylinders 57 and 58. Therefore the steel balls 52a are pressed against the conical surface portion of the hollow portion 51a. In a frustoconical portion 51b formed in the lower inner cylinder 58 are received also a plurality of steel balls 52b which are pressed against the conical surface of hollow portion 51b through a steel ball retainer 53b under the force of a spring 54b loaded between the retainer 53b and the collar 59. The large-diameter base portion of the outer cylinder 46 is encased in a cylinder 61 with an annular cap 62 at the upper end thereof. A spring 63 is loaded between the upper surface of the bracket 6 and the annular shoulder of the outer cylinder 46 so that the latter may be so biased as to normally move upwardly away from the bracket 6 and to normally engage the annular shoulder of the large-diameter base portion of the outer cylinder 46 with the annular cover 62. A ball pushing rod 64 is securely fixed to the bracket 6 so as to extend into the lower inner cylinder 58.

Next the mode of operation of the second embodiment will be described. When the feed adjusting device 16 is moved downwardly and engages with the top of the inner cylinder 49, the outer cylinder 46 is moved downwardly and engaged with the bracket 6 before the inner cylinder 49 is caused to move downwardly because the force of the spring 63 in the cylinder 61 for biasing the outer cylinder 46 upwardly is weaker than the force of the spring 50 which biases the inner cylinder 49 upwardly. Therefore, the steel ball pushing rod 64 is forced into the lower inner cylinder 58 immediately before the outer cylinder 46 abuts against the bracket 6 so that the steel balls 52b are pushed upwardly. As a result, the solder wire 15 is released from the steel balls 52b. In this case the steel balls 52, 52a in the upper inner cylinder 57 clamp the solder wire 15 and moves it downwardly by the distance equal to the downstroke of outer cylinder. When the outer cylinder 49 has been made in contact with the bracket 6, then the inner cylinder 49 is moved downwardly by the feed adjusting device 16 against the spring 50 so that the solder wire 15 is clamped by the steel balls 52 which are pressed against the conical surface of the hollow portion 51 so that they are forced toward the solder wire 15 and are moved downwardly by a distance equal to the downstrokes of inner cylinder 49. In this case, the steel balls 52a in the upper inner cylinder 57 are moved away from the solder wire 15 because the latter is moved downwardly so that the steel balls 52a will not exert the clamping forces to the solder wire 15, and the steel balls 52b will not exert the clamping forces to the solder wire 15 as they are pushed upwardly by the push rod 64. Thus the solder wire 15 is fed by a predetermined distance toward the soldering bit 3.

In the upward stroke of the feed adjusting device 16, the inner cylinder 49 is first permitted to return to its initial position under the force of the spring 50. In this case the steel balls 52 will not exert the clamping forces to the solder wire 15, but the steel balls 52a in the upper inner cylinder 57 exert the clamping forces to the solder wire 15 so that the latter is clamped and will not follow the upward movement of the inner cylinder 49. In other words, the upper inner cylinder serves as a stopper or clamp for the solder wire 15. When the feed adjusting device 16 is further moved upwardly and away from the inner cylinder 49, the outer cylinder 46 is now permitted to return to its initial position under the returning force of the 63. As a consequence the lower inner cylinder 58 is moved away from both the bracket 6 and the push rod 64 so that the steel balls 52b are returned to the solder wire clamping position under the force of the spring 54b. The solder wire 15 is now clamped by the steel balls 52b. As a result the solder wire 15 is moved upwardly by a distance equal to the upward or return stroke of the outer cylinder 46 after it is clamped.

A solder wire guide hole 65 is formed through the center of the partition wall between the upper and lower hollow portions of the outer cylinder 46, and holes 66, 67, 68, 69, 70, 71, 72 and 73 are formed through the inner cylinders 49, 57 and 58, the cap 55, the collar 59 and the steel ball retainers 53, 53a and 53b, respectively for passing the solder wire.

Next the general mode of operation of the automatic soldering machine incorporating the solder feeding device of the second embodiment of the present invention will be described. After the joints 42 have been set in soldering position, the power cylinder 19 is actuated to retract the cylinder rod 20 so that the head structure 11 is lowered along the guide rods 22. The bracket 6 is lowered until it abuts against the stopper 7 and in this case the soldering bit 3 engages with the joints 42. When the head structure 11 is further lowered so that the feed adjusting device 16 is inserted into the hole 48 of the solder wire feed device 9 and engaged with the inner cylinder 49, the outer cylinder 46 is first caused to move downwardly in the manner described hereinbefore. As a consequence the inner cylinder 58 is engaged with the bracket 6 whereas the steel balls push rod 64 which is fitted into the hole 68 at the bottom of the lower inner cylinder 58 so that the steel balls 52b are moved upwardly. As a consequence, the solder wire 15 is released from the clamping steel balls 52b, and the free end of of the solder wire 15 reaches the pointed end of the nozzle 18. When the feed adjusting device 16 is further moved downwardly, the inner cylinder 49 is now forced to move downwardly so that the steel balls 52 clamp the solder wire 15 in the manner described hereinbefore and move it downwardly by a distance equal to the downstroke of the inner cylinder 49. Therefore, the free end of the solder wire 15 in the nozzle 18 is fed by the same distance toward the soldering bit 3 and melted for soldering the joints 42. After the solder has been applied to the joints 42, the power cylinder is is so actuated to advance the cylinder rod 20 so that the feed adjusting device 16 moves upwardly, and so does the inner cylinder 49 under the returning force of the spring 50 until the inner cylinder 49 engages with the cap 48. In this case the steel balls 52a in the upper inner cylinder 57 are clamping the solder wire 15 so that the solder wire is held in stationary position while the inner cylinder 49 is moved upwardly. After the inner cylinder 49 has returned to its initial position, the outer cylinder 46 is caused to move upwardly to its initial position under the force of the spring 63 away from the bracket 6 and hence the push rod 64. As a consequence the steel balls 52b are released from the push rod 64 and are returned to their initial positions under the force of the spring 54b so that the solder wire 15 is now clamped while the outer cylinder 46 is returned to its initial position at which it engages with the annular cap 52. This means that the solder wire 15 is moved upwardly by a distance equal to the upward stroke of the outer cylinder 46 after the solder wire 15 is clamped. When the rod 20 is further advanced, the feed adjusting device 16 is moved away from the top of the inner cylinder 49, and when the upper flanges 10a of the sliding shafts 10 engage with the cylinder bores 11a, the bracket 6 and hence the soldering iron 1 and the solder wire feed device 9 are moved upwardly in unison with the head structure 11 to their initial positions respectively. The above operation is automatically repeated to continuously solder the joints.

In the automatic soldering machine incorporating the solder wire feed device of the second embodiment of the present invention, after the solder has been applied to the joints, the steel balls 52b in the lowermost inner cylinder 58 clamp the solder wire 15 and move it upwardly so that the free end of the solder wire 15 may be moved away from the soldering bit 3. As a consequence, the undesirable melting of the solder wire by the heat from the soldering bit may be positively prevented. Furthermore, the undesirable flow of the flux in the solder wire may be also prevented.

What is claimed is:

1. An automatic soldering machine comprising
a. a reciprocating member capable of making an advance stroke and a return stroke upon which is mounted rotatably a solder wire supply reel,
b. a supporting member for a soldering iron, a solder wire guide and a solder wire feed nozzle, said supporting member being suspended from said reciprocating member and adapted to make an advance stroke in the first half of the advance stroke of said reciprocating member and to make a return stroke in the last half of the return stroke of said reciprocating member,
c. means for limiting the advance stroke of said supporting member,
d. a solder wire feeding device mounted on said supporting member and adapted to be actuated in the last half of the advance stroke of said reciprocating member and in the last half of the return stroke of said reciprocating member,
e. means for actuating said reciprocating member, said solder wire feeding device comprising an outer cylinder and an inner cylinder slidably fitted therein for reciprocal motion by said reciprocating member, the solder wire being fed from said solder wire supply reel through said outer and inner cylinders of said solder wire feeding device, said solder wire guide and said solder feed nozzle, said solder wire feeding device further comprising solder wire clamping mechanisms located in the base portion of said outer cylinder and in said inner cylinder, each of said solder wire clamping mechanisms comprising clamping means which release the solder wire when the latter is moved in the feed direction relative to said outer and inner cylinders and which clamp the solder wire when the solder wire is moved in the direction opposite to said feed direction.

2. An automatic soldering machine set forth in claim 1 wherein a compression spring is loaded between said outer and inner cylinders; and each of said solder wire clamping mechanisms comprises a plurality of balls arranged so as to surround the solder wire,
a hollow portion which has a conical surface, a retainer for retaining said plurality of balls in position, and
a spring for pressing said plurality of balls against said conical surface of said hollow portion through said retainer.

3. An automatic soldering machine set forth in claim 1 comprising a soldering iron supported on said supporting member by adjusting pins extending from said supporting member,
a soldering iron supporting member which is guided by said adjusting pins, and
compression spring fitted over said adjusting pins between the heads thereof and said soldering iron supporting member.

4. An automatic soldering machine set forth in claim 1 wherein said means for limiting the advance stroke of said supporting member is adjustable in position so that the advance stroke of said supporting member may be varied.

5. An automatic soldering machine set forth in claim 1 wherein said solder wire guide is adjustable in position relative to said supporting member whereas said solder wire feed nozzle is adjustable in position relative to said solder wire guide.

6. An automatic soldering machine set forth in claim 1 comprising a soldering iron mounted on said supporting member, and means for forwardly or backwardly inclining said machine so that the angular positions of said solder wire feed nozzle and said soldering iron may be varied relative to the joints to be soldered.

7. An automatic soldering machine set forth in claim 2 wherein each of said ball retainers is provided with a plurality of radial grooves for receiving therein said plurality of balls.

8. An automatic soldering machine comprising
a. a reciprocating member capable of making an advance stroke and a return stroke upon which is mounted a solder wire supply reel,
b. a supporting member for supporting a soldering iron, a solder wire guide and a solder wire feed nozzle, said supporting member being suspended from said reciprocating member and adapted to make an advance stroke in the first half of the advance stroke of said reciprocating member and to make a return stroke in the last half of the return stroke of said reciprocating member,
c. means for limiting the end of the advance stroke of said supporting member,
d. a solder wire feeding device mounted upon said supporting member through a first compression spring and is actuated in the last half of the advance stroke and in the first half of the return of said reciprocating member,
e. means for actuating said reciprocating member, said solder wire feeding devices comprising an outer cylinder and an inner cylinder which is slidably fitted into said outer cylinder for reciprocal motion by said reciprocating member,
the solder wire passing along the axes of said inner and outer cylinders, said solder wire guide and said solder wire feed nozzle,
said inner cylinder comprising a first solder wire clamping mechanism which is adapted to release the solder wire when the latter is moved in the feed direction relative to said inner cylinder and clamps the solder wire when the latter is moved in the direction opposite to said feed direction,
said outer cylinder further comprising second and third clamping mechanisms which are similar in construction and function to said first clamping mechanism and are located below said first clamping mechanism in the order named, said third clamping mechanism being reversed in direction relative to said second clamping mechanism and releasing the solder wire when the advance stroke of said outer cylinder is started while clamping the solder wire at a time closer to the end of the return stroke of said outer cylinder than said second clamping mechanism.

9. An automatic soldering machine set forth in claim 8 wherein a second compression spring which is stronger than said first compression spring is loaded between said outer and inner cylinder.

10. An automatic soldering machine as set forth in claim 8 comprising a soldering iron mounted on said mounting means, and wherein the solder wire is further advanced when the feeding end of the solder wire and the tip of said soldering iron have approached the joints to be soldered.

11. An automatic soldering machine set forth in claim 8 wherein the feeding end of the solder wire is retracted away from the feeding end of said solder wire feed nozzle after the solder has been applied to the joints.

* * * * *